United States Patent
Bonetto et al.

(10) Patent No.: US 7,047,701 B2
(45) Date of Patent: May 23, 2006

(54) JOINTING COMPOUND OR PLASTER FOR CONSTRUCTION ELEMENTS AND ITS METHOD OF PREPARATION

(75) Inventors: Christian Bonetto, Cavaillon (FR); Pascal Bourne-Chastel, Saint Didier (FR); Alain Petit, Isle sur Sorgue (FR)

(73) Assignee: Lafarge Platres, Avignon (FR)

( * ) Notice: Subject to any disclaimer, the term of this patent is extended or adjusted under 35 U.S.C. 154(b) by 48 days.

(21) Appl. No.: 10/345,141

(22) Filed: Jan. 16, 2003

(65) Prior Publication Data

US 2003/0153651 A1 Aug. 14, 2003

Related U.S. Application Data

(63) Continuation of application No. PCT/FR01/02269, filed on Jul. 12, 2001.

(51) Int. Cl.
*E04B 2/00* (2006.01)

(52) U.S. Cl. .............................. 52/415; 52/416; 52/459; 52/461; 52/741.41; 52/741.4; 156/39; 524/423; 428/703; 106/638

(58) Field of Classification Search .................. 52/415, 52/416, 417, 459, 461, 470, 471, 741.41, 52/741.4, 506.01, 282.1, 533, 782.1; 106/675, 106/672, 677–679, 680, 778–783, 638, 724, 106/727, 728, 808, 823, 772–774, 698, 801–803, 106/811, 814, 817; 156/39; 524/423; 428/703
See application file for complete search history.

(56) References Cited

U.S. PATENT DOCUMENTS

| | | | |
|---|---|---|---|
| 2,456,269 A | | 12/1948 | Gill |
| 3,804,706 A | * | 4/1974 | Kurashige et al. .......... 162/109 |
| 3,876,561 A | | 4/1975 | Perna |
| 3,951,190 A | * | 4/1976 | Suter ...................... 244/135 B |
| 4,172,735 A | * | 10/1979 | Wegerhoff et al. ........ 106/18.12 |
| 4,267,092 A | * | 5/1981 | Glaser et al. .................. 524/5 |
| 4,372,814 A | | 2/1983 | Johnstone et al. |
| 4,447,491 A | * | 5/1984 | Bradbury et al. ......... 428/304.4 |
| 4,487,657 A | * | 12/1984 | Gomez ....................... 162/158 |
| 4,510,019 A | * | 4/1985 | Bartelloni .................... 162/141 |
| 4,738,994 A | * | 4/1988 | Weiss ......................... 523/401 |
| 4,853,085 A | | 8/1989 | Johnstone et al. |
| 5,013,389 A | | 5/1991 | Retti |
| 5,240,500 A | | 8/1993 | Retti |
| 5,279,684 A | | 1/1994 | Retti |
| 5,279,700 A | | 1/1994 | Retti |
| 5,661,211 A | | 8/1997 | Todd |
| 6,105,325 A | * | 8/2000 | Zuber et al. ................... 52/416 |
| 6,117,229 A | * | 9/2000 | Cassar et al. ................ 106/724 |
| 6,231,970 B1 | * | 5/2001 | Andersen et al. ........... 428/332 |
| 6,251,979 B1 | * | 6/2001 | Luongo ...................... 524/423 |
| 6,319,312 B1 | * | 11/2001 | Luongo ...................... 106/675 |
| 6,391,958 B1 | * | 5/2002 | Luongo ...................... 524/423 |
| 6,403,688 B1 | * | 6/2002 | Luongo ...................... 524/423 |
| 6,406,536 B1 | * | 6/2002 | Cassar et al. ................ 106/723 |
| 6,436,185 B1 | * | 8/2002 | Ayambem et al. .......... 106/793 |
| 6,645,291 B1 | * | 11/2003 | Ayambem et al. .......... 106/793 |

FOREIGN PATENT DOCUMENTS

| | | |
|---|---|---|
| EP | 0 456 435 A1 | 11/1991 |
| FR | 2 736 079 A | 1/1997 |
| JP | 59-78963 | 5/1984 |

* cited by examiner

*Primary Examiner*—Jeanette Chapman
(74) *Attorney, Agent, or Firm*—Burns, Doane, Swecker & Mathis, L.L.P.

(57) ABSTRACT

A jointing compound or plaster for construction elements, particularly paper-faced plasterboards. This plaster includes, in percentages by weight with respect to the total weight of plaster 50 to 85% of a mineral filler; 1 to 20% of an organic binder dispersible in an aqueous phase; 1 to 15% of a silicate-based agent other than the mineral filler; 0.2 to 5% of a hydrophobic agent which is a silicone derivative; 0.05 to 5% of polyvinyl alcohol; and water to make up to 100%. A method of producing a work such as a partition, a wall covering or a ceiling is also disclosed.

14 Claims, No Drawings

JOINTING COMPOUND OR PLASTER FOR CONSTRUCTION ELEMENTS AND ITS METHOD OF PREPARATION

CROSS-REFERENCE TO RELATED APPLICATIONS

The present application is a continuation of PCT International Application No. PCT/FR01/02269, filed in France on Jul. 12, 2001, which claims the priority of French Patent Application No. 00 09 393, filed in France on Jul. 18, 2000, the entire contents of both applications are hereby incorporated herein by reference.

BACKGROUND OF THE APPLICATION

The present invention relates to a jointing compound or plaster for construction elements, particularly paper-faced plasterboards, and to a method of producing a work such as a partition, a wall covering or a ceiling.

It is well known to use plasterboards for producing partitions, coverings for vertical or inclined elements, or for producing ceilings, whether suspended or not.

These boards generally consist of a core, essentially made of plaster, covered on each of its sides with a sheet, which serves both as reinforcement, and as facing and which may consist of paperboard or of mineral fibres.

The subject matter of the international application published under number WO-A-9702395 is a method of constructing finishings, in which plasterboards are joined together with a first plaster and the joints between the boards are finished off with a complementary plaster having the following composition:

50 to 85% of a mineral filler;
1 to 20% of an organic binder dispersible in an aqueous phase;
0.2 to 5% of a hydrophobic agent;
1 to 15% of a workability agent (water-retaining agent/ thickener);
0.1 to 2% of a slip agent;
1 to 12% of a complementary slip agent;
0.1 to 5% of a dispersant;
0.001 to 0.015% of a pigment;
0.1 to 0.3% of a biocide;
0.1 to 0.3% of an antifoam agent; and
water.

The colour of this plaster is matched as best as possible to that of the facing paper.

However, such a plaster is a finishing plaster, which means that it cannot be used for filling the space between two boards, especially because it does not allow good bonding and adhesion of the jointing tape. It is therefore necessary to have two plasters: a first plaster, called filling plaster, used to fill the space between two boards, and a second plaster, called finishing plaster, which finishes off the junction between the two boards.

Furthermore, such a plaster has too great a shrinkage after hardening. The colour of the filling plaster is of little matter as it will be covered with the finishing plaster. On the other hand, it must, after drying, have a negligible shrinkage as it is applied with a significant thickness.

However, the colour of the finishing plaster is important as it must be as close as possible to that of the facing of the plasterboard. But it is not necessary for the shrinkage of the finishing plaster after drying to be very low, since this plaster is applied only with a small thickness. The aforementioned application WO-A-9702395 therefore does not address the problem of shrinkage after drying, since this does not matter for the application as a finishing plaster.

It would therefore be beneficial to have a plaster, which could serve both as filling plaster and as finishing plaster. Such a plaster would therefore have to have one or more, preferably all, of the following properties:

good adhesion to the paper constituting the facing of the plaster board;
good bonding and good adhesion of the jointing tape;
a colour identical to that of the facing paper;
a negligible shrinkage after drying (for example, less than 20% as determined by the ring test);
water absorption as close as possible to that of the facing paper, so as to avoid having to use a primer coat before wallpapering or painting;
moderate adhesion of the paper constituting the wallpaper, so as to make it possible for it to be stripped off subsequently one or more times;
easy paintability.

The Applicant has therefore carried out extensive research for the purpose of developing such a plaster.

It has now succeeded in doing so and consequently proposes a plaster having the following composition: in percentages by weight with respect to the total weight of plaster:

50 to 85% of a mineral filler;
1 to 20% of an organic binder dispersible in an aqueous phase;
1 to 15% of a silicate-based agent;
0.2 to 5% of a hydrophobic agent which is a silicone derivative;
0.05 to 5% of polyvinyl alcohol; and
water to make up to 100%.

A second subject of the present invention is a method of preparing the plaster, in which the constituents of the plaster are mixed in any order.

A third subject of the present invention is a method of producing a work, comprising the juxtaposition of construction elements, the filling of the space between the construction elements by means of a filling plaster, the laying of a tape and the covering of the tape by means of a finishing plaster and is characterized in that the same plaster is used as filling plaster and as finishing plaster.

Further characteristics and advantages of the invention will now be described in detail in the description, which follows.

PLASTER ACCORDING TO THE INVENTION

The plaster according to the invention therefore comprises, in percentages by weight with respect to the total weight of plaster:

50 to 85% of a mineral filler;
1 to 20% of an organic binder dispersible in an aqueous phase;
1 to 15% of a silicate-based agent;
0.2 to 5% of a hydrophobic agent which is a silicone derivative;
0.05 to 5% of polyvinyl alcohol; and
water to make up to 100%.

As mineral filler, any mineral filler commonly employed for the manufacture of a jointing compound or plaster may be used. In general, the mineral filler will be light in colour, preferably white, and the mean diameter $d_{50}$ of which is in general between 5 and 35 microns, so that the plaster after drying gives a smooth finish corresponding to that of the facing of the board.

As examples of mineral filler, mention may be made of calcium carbonate, anhydrous or dihydrated calcium sulphate, magnesium carbonate, dolomite, silicas, silicates, aluminates and other such materials.

Preferably, calcium carbonate $CaCO_3$ is used.

The mineral filler preferably represents between 50 and 70% of the total weight of the plaster.

According to one embodiment, the binder/silicate-based agent weight ratio is between 0.5 and 2.

According to one embodiment, the binder/hydrophobic agent weight ratio is between 1.5 and 10.

According to an advantageous embodiment of the invention, the mineral filler furthermore includes perlite, preferably expanded and even more preferably hydrophobic perlite. The amount of perlite is then generally between 2 and 5%.

As organic binder dispersible in an aqueous phase, mention may be made of polyvinyl acetate homopolymers (plasticized or unplasticized), ethylene/vinyl acetate copolymers (plasticized or unplasticized EVAs), ethylene/vinyl versatate copolymers, vinyl acetate/vinyl versatate copolymers, polyacrylics, vinyl acetate/acrylic copolymers, styrene/acrylic copolymers, styrene/butadiene copolymers, vinyl acetate/vinyl versatate/vinyl maleate terpolymers, vinyl acetate/vinyl versatate/acrylic terpolymers, acrylic terpolymers and blends thereof.

The proportion of organic binder is preferably between 2 and 12% of the total weight of the plaster.

The silicate-based agent (different from the mineral filler) preferably comprises talc and/or mica and/or a clay. Preferably, a mixture of talc and mica is used.

The proportion of silicate-based agent is preferably between 3 and 10% of the total weight of the plaster.

The hydrophobic agent is a silicone derivative. As silicon derivatives, mention may be made of siliconates, silanes, hydrogenated silicone oils, silicone emulsions, aminosilicone emulsions, alkylsiloxane resins, such as hydrogenomethyl-polysiloxane and aminated polydimethyl-siloxane, and mixtures thereof.

Preferably, a resin of the aminated polydimethyl-siloxane type is used as silicone derivative.

The proportion of silicone derivative is preferably between 0.5 and 3% of the total weight of the plaster.

Advantageously, the proportion of silicone derivative is chosen so as to allow a joint to be produced which has the same surface properties as those of the facing paper. These surface properties are decolouration or colouration owing to the effect of the natural colour, reflectance and surface water absorption. These properties are described in detail in application WO-A-9702395 (the content of which is incorporated as reference), to which reference may be made for further details. It is understood that the technical characteristics described in that application apply mutadis mutandis to the present application.

The proportion of polyvinyl alcohol is preferably between 0.05 and 1% of the total weight of the plaster.

According to an advantageous embodiment, the plaster furthermore includes starch and/or a starch derivative.

The proportion of starch and/or starch derivative is in general between 0.05 and 5%, preferably between 0.1 and 1%, of the total weight of the plaster.

The plaster according to the invention may be prepared by mixing its constituents in any order.

Of course, provided that the proportions assigned to each of the essential constituents are respected, it is possible to introduce into the plaster according to the invention, as secondary ingredients, additives normally used to facilitate the processing of the other constituents or for conferring additional particular properties on the plaster. By way of examples of such additives, mention may be made of water-retaining agents or thickeners, slip agents, dispersants, antigels, pigments, biocides and antifoams. These additives are described, for example, in the application WO-A-9702395 (the content of which is incorporated by reference), to which reference may be made for further details.

The plaster according to the invention can be used for producing, by means of plasterboards, many types of work, such as partitions, wall coverings or ceilings, whether suspended or not.

The plaster according to the invention is particularly suitable for producing a work by means of paper-faced plasterboards.

Of course, the plaster according to the invention may be used merely as a finishing plaster, a conventional plaster providing the function of a filling plaster.

METHOD ACCORDING TO THE INVENTION

The production of a work by means of plasterboards generally comprises the juxtaposition of plasterboards, the filling of the space between the boards by means of a filling plaster, the laying of a tape, the covering of the tape by means of the filling plaster and the covering of the filling plaster with a finishing plaster.

Surprisingly, the Applicant has succeeded in producing a work using, as filling plaster and as finishing plaster, one and the same plaster. This is achieved by:

(1) the plaster that has been developed and has been described hereinabove; and/or (2) by matching the content of hydrophobic agent (silicone) of the finished or completed joint (namely filled and finished) with the content of hydrophobic agent (silicone) of the facing of the board; and/or (3) by increasing the binder content of the plasters of the type of those described in the application WO-A-9702395 and, optionally, the content of silicate-based agents (other than the mineral filler).

With regard to point (1), the plaster has been described in detail above.

With regard to point (2), the matching of the silicone contents of the facing and of the plaster was not clearly demonstrated in the application WO-A-9702395. The invention therefore proposes to optimize the plaster content/facing content weight ratio, of between 3 and 10, with preferred content values for the facing and the board.

With regard to point (3), the adhesion to tape was not discussed and not demonstrated in the application WO-A-9702395, since the adhesion to tape is not a criterion for finishing plasters. The invention therefore proposes to increase the binder content and/or to add polyvinyl alcohol to plasters of the type described in that application WO-A-9702395 in order to optimize the adhesion to tape (without the other properties being affected).

According to an additional and advantageous characteristic of the invention, plasterboards which have a paper facing, the silicone content of the coating of which is between 0.1 and 1%, are joined together. According to another characteristic, the content of the hydrophobic or silicone agent of the plaster is between 0.5 and 3%. The plaster content/facing content weight ratio is between 3 and 10 for the optimization described above.

This therefore constitutes an excellent compromise between easy painting, effective retention of the wallpaper, strippability of the wallpaper and good adhesion of the plaster to the facing of the plasterboard, as will become apparent on reading the examples which follow.

European Patent Application No. EP 521 804 in the name of the Applicant describes a paper for covering plasterboards, and the plasterboards covered with this paper. These boards are very suitable for use with the plaster according to the invention.

EXAMPLES

The following examples are given purely by way of illustration and imply no limiting character.

Example 1

A control plaster, the composition of which is in accordance with the aforementioned international application WO-A-9702395, and plasters A to F according to the invention were prepared.

The various plasters were composed, apart from the essential constituents, of additives normally used in the manufacture of plasters and well known to those skilled in the art.

The composition of the various plasters is given in the following table:

(1): hydrophobic expanded perlite;
(2): resin of the aminated polydimethylsiloxane type;
(3): modified cellulose ether;
(4): synergistic mixture of aromatic (non-metallic, non-phenolic) compounds.

Example 2

Tests were carried out on the adhesion of the PREGYLISS 35 setting plaster from the Lafarge Plâtres range to boards as described in the aforementioned application EP-A-521 804, having:

a) a coating containing 0% silicone;
b) a coating containing 0.2% silicone;
c) a coating containing 0.4% silicone.

It was found that too high a silicone content in the coating was unfavourable to good bonding of the conventional setting plaster (adhesion value at best 0.25 MPa).

Example 3

Adhesion tests were carried out under the conditions described in paragraph 6.5 of the draft European Standard CEN241N175 of January 1998, which covers the characteristics of coatings on specimens of the control plaster and plasters A to F of Example 1, with boards having a silicone content in the coating of 0.4%.

The tape adhesion was determined under the conditions described in "Guide Technique—Enduits de traitement des joints enire plaques de plâtre—Modalités d'essais" [*Technical Guide—Plasters for treating joints between plasterboards—Test methods*] of Specialist Group No. 9 of the Commission of the CSTB responsible for drawing up technical literature (January 1999).

The results are given in the table below.

| Constituents | | Plasters | | | | | | |
|---|---|---|---|---|---|---|---|---|
| Function | Nature | Control | A | B | C | D | E | F |
| Mineral filler | CaCO$_3$ | 55.722 | 56.522 | 56.322 | 55.622 | 56.022 | 55.122 | 56.522 |
| Mineral filler | Perlite[1] | 3.535 | 3.535 | 3.535 | 3.535 | 3.535 | 3.535 | 3.535 |
| Binder | EVA resin | 3.6 | 3.6 | 3.6 | 4.5 | 3.6 | 4.5 | 3.6 |
| Hydrophobic agent | Siloxane[2] | 2.0 | 2.0 | 2.0 | 2.0 | 2.0 | 2.0 | 1.0 |
| Workability agent | Talc | 1.35 | 1.35 | 1.35 | 1.35 | 1.35 | 1.35 | 1.35 |
| Water-retaining agent/thickener | Ether[3] | 0.45 | 0.45 | 0.45 | 0.45 | 0.45 | 0.45 | 0.45 |
| Slip agent | Mica | 3.6 | 3.6 | 3.6 | 3.6 | 3.6 | 3.6 | 3.6 |
| Dispersant/Antigel | Ethylene glycol | 0.577 | 0.577 | 0.577 | 0.577 | 0.577 | 0.577 | 0.577 |
| Pigment | Iron oxide | 0.01 | 0.01 | 0.01 | 0.01 | 0.01 | 0.01 | 0.01 |
| Biocide | Mixture[4] | 0.084 | 0.084 | 0.084 | 0.084 | 0.084 | 0.084 | 0.084 |
| Antifoam agent | Nonionic surfactant | 0.072 | 0.072 | 0.072 | 0.072 | 0.072 | 0.072 | 0.072 |
| Cohesion resin | EVOH | 0 | 0.2 | 0.4 | 0.2 | 0.2 | 0.2 | 0.2 |
| Adhesion promoter | Starch derivative | 0 | 0 | 0 | 0 | 0.5 | 0.5 | 0 |
| Balance to 100 | Water | 29 | 28 | 28 | 28 | 28 | 28 | 29 |
| TOTAL | | 100 | 100 | 100 | 100 | 100 | 100 | 100 |

[1]: hydrophobic expanded perlite;
[2]: resin of the aminated polydimethylsiloxane type;
[3]: modified cellulose ether;
[4]: synergistic mixture of aromatic (non-metallic, non-phenolic) compounds.

| Type of test | Plasters | | | | | | |
|---|---|---|---|---|---|---|---|
| | Control | A | B | C | D | E | F |
| Adhesion | | | | | | | |
| Values (MPa) | 0.249 | 0.362 | 0.418 | 0.433 | 0.336 | 0.397 | 0.418 |
| Shore C hardness | 60 | 67 | 71 | 71 | 66 | 73 | 70 |
| A2P ® tape bonding | | | | | | | |
| Mass (g) | 376 | 1052 | 1357 | 1331 | 1148 | 1763 | 1326 |
| Delamination (%) | 0 | 0 | 45 | 10 | 5 | 65 | 15 |
| SOROPA ® tape bonding | | | | | | | |
| Mass (g) | 522 | 1160 | 1425 | 1366 | 1278 | 1585 | 1360 |
| Delamination (%) | 0 | 20 | 75 | 50 | 35 | 100 | 85 |

It is clearly apparent that all the plasters according to the invention have a higher performance than the control plaster.

Example 4

Joints as indicated in Example 3 were produced. A wallpaper was then pasted onto them in the conventional way.

Next, for the purpose of determining the impact of the silicone content of the coating of the facing paper of the boards on the stripping behaviour, a steam-stripping test was carried out.

It was found that stripping was more difficult when the boards have a coating containing no silicone.

Thus, wallpaper was applied and then removed several times. The results are the same as for the first stripping. However, it was noted that, on boards with a silicone coating, at each stripping operation markedly more adhesive was removed than on boards with a non-silicone coating.

Example 5

A test was carried out to determine the shrinkage after drying. The following results were obtained:

| Plaster | Control | A | B |
|---|---|---|---|
| Shrinkage (%) | 21 | 17 | 17 |

The shrinkage of the plaster according to the invention is less than that of the control.

Example 6

A test was carried out under the conditions described in the application WO-A-9702395 in order to determine the L*, a* and b* values (CIE 1976 standard, Minolta CR310 apparatus). The following values were obtained, the middle column giving the average value for the plasters according to the invention and the right-hand column for the board according to application EP-A-521 804 used in Example 3.

| | Plaster | Board |
|---|---|---|
| L* | 86 to 88.2 | 86.5 to 88.7 |
| a* | −0.5 to −0.7 | −0.3 to −0.6 |
| b* | 3.7 to 4.1 | 2.8 to 3.8 |

The differences between the plaster and the board are imperceptible to the eye. The surface characteristics, as expressed according to the aforementioned application WO-A-9702395, are therefore very good.

The plaster according to the invention may be a setting plaster or a drying plaster; preferably it is a drying plaster. In the latter case, the drying plaster is advantageously a plaster called ready-mix plaster, that is to say one into which water has already been incorporated.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A jointing compound or plaster for construction elements comprising, in percentages by weight with respect to the total weight of plaster:
   50 to 85% of a mineral filler;
   1 to 20% of an organic binder dispersible in an aqueous phase;
   1 to 15% of a silicate-based agent other than the mineral filler;
   0.2 to 5% of a hydrophobic agent which is a silicone derivative;
   0.05 to 5% of polyvinyl alcohol; and
   water to make up to 100%.

2. The jointing compound or plaster according to claim 1, which furthermore includes starch or a starch derivative.

3. The jointing compound or plaster according to claim 2, in which the proportion of starch or starch derivative is between 0.05 and 5%.

4. The jointing compound or plaster according to claim 1, in which the silicate-based agent comprises talc or mica or a clay.

5. The jointing compound or plaster according to claim 4, in which the silicate-based agent is a talc/mica mixture.

6. The jointing compound or plaster according to claim 1, in which the binder/silicate-based agent weight ratio is between 0.5 and 2.

7. The jointing compound or plaster according to claim 6, in which the binder/hydrophobic agent weight ratio is between 1.5 and 10.

8. The jointing compound or plaster according to claim 1, in which the mineral filler furthermore includes perlite.

9. The jointing compound or plaster according to claim 8, in which the mineral filler comprises between 2 and 5% perlite with respect to the total weight of the plaster.

10. The jointing compound or plaster according to claim 1, in which the organic binder dispersible in an aqueous phase is chosen from the group consisting of polyvinyl acetate homopolymers (plasticized or unplasticized), ethylene/vinyl acetate copolymers (plasticized or unplasticized EVAs), ethylene/vinyl versatate copolymers, vinyl acetate/vinyl versatate copolymers, polyacrylics, vinyl acetate/acrylic copolymers, styrene/acrylic copolymers, styrene/butadiene copolymers, vinyl acetate/vinyl versatate/acrylic terpolymers, vinyl acetate/vinyl versatate/vinyl maleate terpolymers, acrylic terpolymers and blends thereof.

11. The jointing compound or plaster according to claim 1, in which the silicone derivative is chosen from the group consisting of siliconates, silanes, hydrogenated silicone oils, silicone emulsions, aminosilicone emulsions, alkylsiloxane resins, such as hydrogenomethylpolysiloxane and aminated polydimethylsiloxane, and mixtures thereof.

12. The jointing compound or plaster according to claim 1, in which the mineral filler comprises calcium carbonate $CaCO_3$.

13. The jointing compound or plaster according to claim 1, comprising, in percentages by weight with respect to the total weight of plaster:

50 to 70% of a mineral filler;

2 to 12% of an organic binder dispersible in an aqueous phase;

3 to 10% of a silicate-based agent;

0.5 to 3% of a hydrophobic agent which is a silicone derivative;

0.05 to 1% of polyvinyl alcohol;

0.1 to 1% of starch and/or a starch derivative; and water to make up to 100%.

14. A method of preparing a jointing compound or plaster according to claim 1, comprising mixing the constituents of the plaster in any order.

* * * * *